US010205926B2

(12) United States Patent
Hettema et al.

(10) Patent No.: US 10,205,926 B2
(45) Date of Patent: Feb. 12, 2019

(54) THREE DIMENSIONAL DISPLAY ENVIRONMENT AND VIEWING THEATER

(71) Applicant: LEGENDS ATTRACTIONS, LLC, New York, NY (US)

(72) Inventors: Philip Hettema, Los Angeles, CA (US); David Revel, Glendale, CA (US); Arthur Derby Ahlstone, Ventura, CA (US)

(73) Assignee: Legends Attractions, LLC, New York, NY (US)

( * ) Notice: Subject to any disclaimer, the term of this patent is extended or adjusted under 35 U.S.C. 154(b) by 0 days.

(21) Appl. No.: 15/168,526

(22) Filed: May 31, 2016

(65) Prior Publication Data
US 2017/0118454 A1   Apr. 27, 2017

Related U.S. Application Data

(60) Provisional application No. 62/168,115, filed on May 29, 2015.

(51) Int. Cl.
*H04N 13/00* (2018.01)
*E04H 3/22* (2006.01)
(Continued)

(52) U.S. Cl.
CPC ............ *H04N 13/128* (2018.05); *A63J 25/00* (2013.01); *E04H 3/22* (2013.01); *G03B 21/562* (2013.01);
(Continued)

(58) Field of Classification Search
CPC ...... E04H 3/22; G03B 21/562; G03B 21/606; H04N 13/0022; H04N 13/0459
See application file for complete search history.

(56) References Cited

U.S. PATENT DOCUMENTS 6,456,339 B1   9/2002 Surati et al.
6,715,888 B1   4/2004 Raskar et al.
(Continued)

FOREIGN PATENT DOCUMENTS

WO   WO 2013019002 A2 *  2/2013 ............... E04H 3/22

OTHER PUBLICATIONS

The International Searching Authority, Notification of Transmittal of the International Search Report, US and Patent Trademark Office, Application No. PCT/US2016/035006, dated Sep. 9, 2016.
(Continued)

*Primary Examiner* — Francis Geroleo
(74) *Attorney, Agent, or Firm* — Gottlieb, Rackman & Reisman, P.C.

(57) ABSTRACT

The invention is generally directed to a visual attraction which provides a multi-dimensional audio/video experience in which the three dimensional screens provide for a three dimensional appearing display of two dimensional images in anticipation of and leading up to a reveal event in which the screens rise to expose a view behind the screens. The visual attraction also collects and separates the visitors to the visual attraction by collecting a predetermined grouping of the visitors and processing them through the attraction in a fashion which provides a manageable flow of visitors spaced apart by the length of the show which then passes the group of visitors in the attraction to the remainder of the attraction before collecting and passing through the next group.

13 Claims, 8 Drawing Sheets

(51) Int. Cl.
G03B 21/56 (2006.01)
G03B 21/606 (2014.01)
H04N 13/128 (2018.01)
A63J 25/00 (2009.01)
H04N 9/31 (2006.01)
G03B 37/04 (2006.01)
H04N 13/363 (2018.01)

(52) U.S. Cl.
CPC .......... *G03B 21/606* (2013.01); *G03B 37/04* (2013.01); *H04N 9/3147* (2013.01); *H04N 13/363* (2018.05)

(56) References Cited

U.S. PATENT DOCUMENTS

| | | | | |
|---|---|---|---|---|
| 9,261,762 | B2* | 2/2016 | Kim | E04H 3/22 |
| 9,523,209 | B2* | 12/2016 | de Lespinois | E04B 1/346 |
| 9,797,150 | B1* | 10/2017 | Warren | E04H 3/30 |
| 2005/0248726 | A1* | 11/2005 | Read | E04H 3/22 352/40 |
| 2007/0193123 | A1* | 8/2007 | Magpuri | E04H 3/22 52/8 |
| 2009/0322740 | A1* | 12/2009 | Carlson | G06T 15/04 345/419 |
| 2014/0259967 | A1* | 9/2014 | Ferguson | A47C 1/121 52/9 |
| 2014/0320824 | A1* | 10/2014 | Kim | E04H 3/22 353/30 |
| 2016/0059147 | A1* | 3/2016 | Bazydlo | A63J 1/02 242/530 |
| 2016/0165196 | A1* | 6/2016 | Gocke | G03B 21/562 352/43 |
| 2016/0333597 | A1* | 11/2016 | de Lespinois | E04B 1/346 |

OTHER PUBLICATIONS

The International Searching Authority, Written Opinion of the International Searching Authority, US and Patent Trademark Office, Application No. PCT/US2016/035006, dated Sep. 9, 2016.

Take a tour of new One World Observatory, Retrieved from the Internet URL: https:///www.youtube.comwatch?v=aDIN26yxbnw, Video Online—(You Tube), pp. 1-2, CBS This Morning, May 20, 2015.

Andrew Sklover, See Forever Theatre, Retrieved from the Internet URL: https://www.youtube.com/watch?v=Ebwa0JuZU7I, Video Online—(You Tube), pp. 1-2, May 28, 2015.

\* cited by examiner

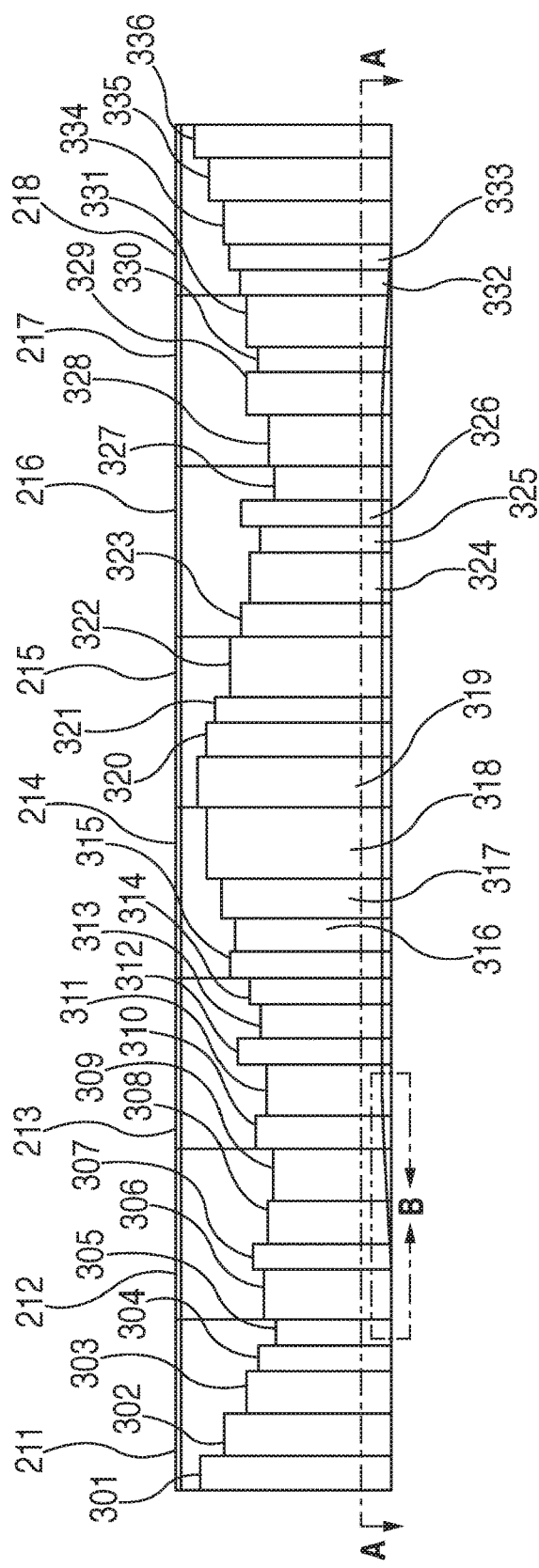
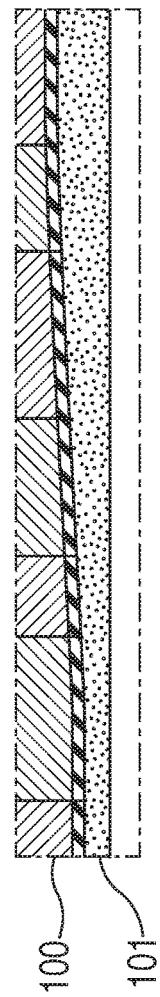
FIG. 3A
FIG. 3B

US 10,205,926 B2

THREE DIMENSIONAL DISPLAY ENVIRONMENT AND VIEWING THEATER

This application claims the priority of U.S. Provisional Patent Application Ser. No. 62/168,115, filed on May 29, 2015.

BACKGROUND OF THE INVENTION

In connection with high altitude observatories and similar attractions in which the initial reveal of a view, perspective or other observation is critical to the enjoyment and enhancement of the viewing experience, there is a need for a theatrical environment in which visitors to the attraction are first exposed to aspects of the environment to be revealed then the significance and orientation of the environment prior to the reveal. There is a need for a theatrical environment in which the viewers are encompassed within a multimedia presentation before the reveal. Generally, reveals are done with some fanfare but, generally, are limited to the opening of curtains or the rising of blinds which are well known and, while including some suspense, are fairly routine. There is a need for an environment which does not presage or otherwise suggest to viewers that they will be seeing the reveal due to the highly immersive nature of the experience and absence of obvious curtains or blinds. Accordingly, there is a need for a theatrical environment which provides a multimedia experience to the visitors and, without apparent or obvious indications, is able to provide a breathtaking reveal without the visitor's anticipation of the reveal moment.

SUMMARY OF THE INVENTION

The invention is generally directed to a theatrical environment in which a multimedia presentation related to the subject of the reveal is provided and the presentation is projected on a stylized multi-surface screen in three dimensions.

The invention is also directed to a three dimensional viewing on a multi-surface screen enabled by digital signal processing of images to create an apparent three dimensional image from a two dimensional image sources.

Still a further object of the invention is to provide a stylized reveal for a visual attraction wherein a theatrical display is provided with the screen for the display acting as the curtain to reveal the visual attraction.

Yet still a further object of the invention is to convert two dimensional images and movies to project onto a three dimensional screen wherein the three dimensional screen has been pixel mapped onto a UV map system so that the texture associated with the three dimensional screen is able to receive a two dimensional image mapped onto the three dimensional screen providing the illusion of a three dimensional display.

Yet still another object of the invention is to provide a viewing theater which provides an audio/visual experience related to an attraction in anticipation of and leading up to the movement of the screen to reveal a visual attraction.

Still a further object of the invention is to provide an improved viewing theater where a three dimensional viewing screen has the two dimensional image to be displayed on it transformed by a signal processor which uses the UV mapping of the three dimensional viewing screen to display the two dimensional image mapped onto the three dimensional viewing screen.

Still other objects and advantages of the invention will, in part, be obvious and will, in part, be apparent from the specification.

The invention accordingly comprises the features of construction, combinations of elements and arrangements of part and processes which will be exemplified in the constructions and processes as hereinafter set forth, and the scope of the invention will be indicated in the claims.

BRIEF DESCRIPTION OF THE DRAWINGS

The present invention will now be described in more complete detail with frequent reference being made to the figures identified below.

FIG. 3A is a front elevational view of the panels of the screen;

FIG. 3B is a cross sectional view along line A-A of FIG. 3A;

DETAILED DESCRIPTION OF THE PREFERRED EMBODIMENTS

Figure 1:
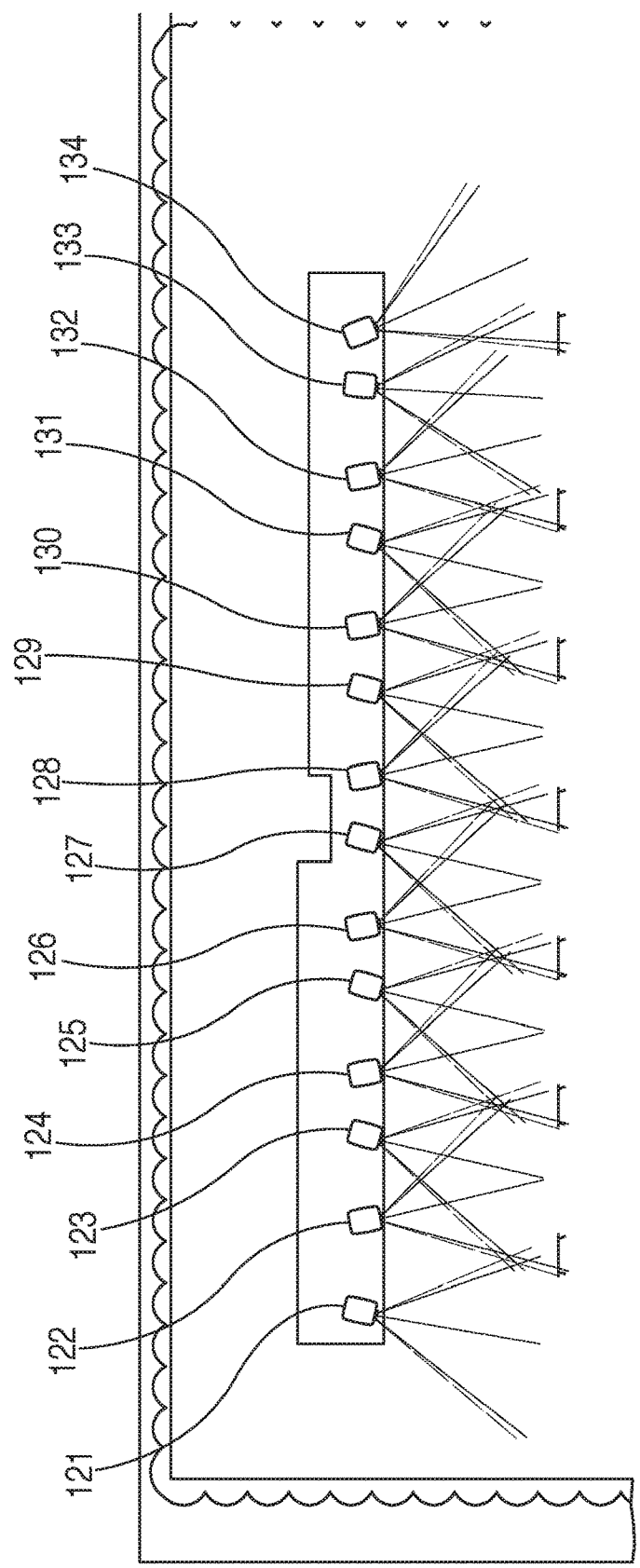
FIG. 1 is a top plan view of the layout of the projectors utilized to project the show on the screens of the attraction.
Figure 7:
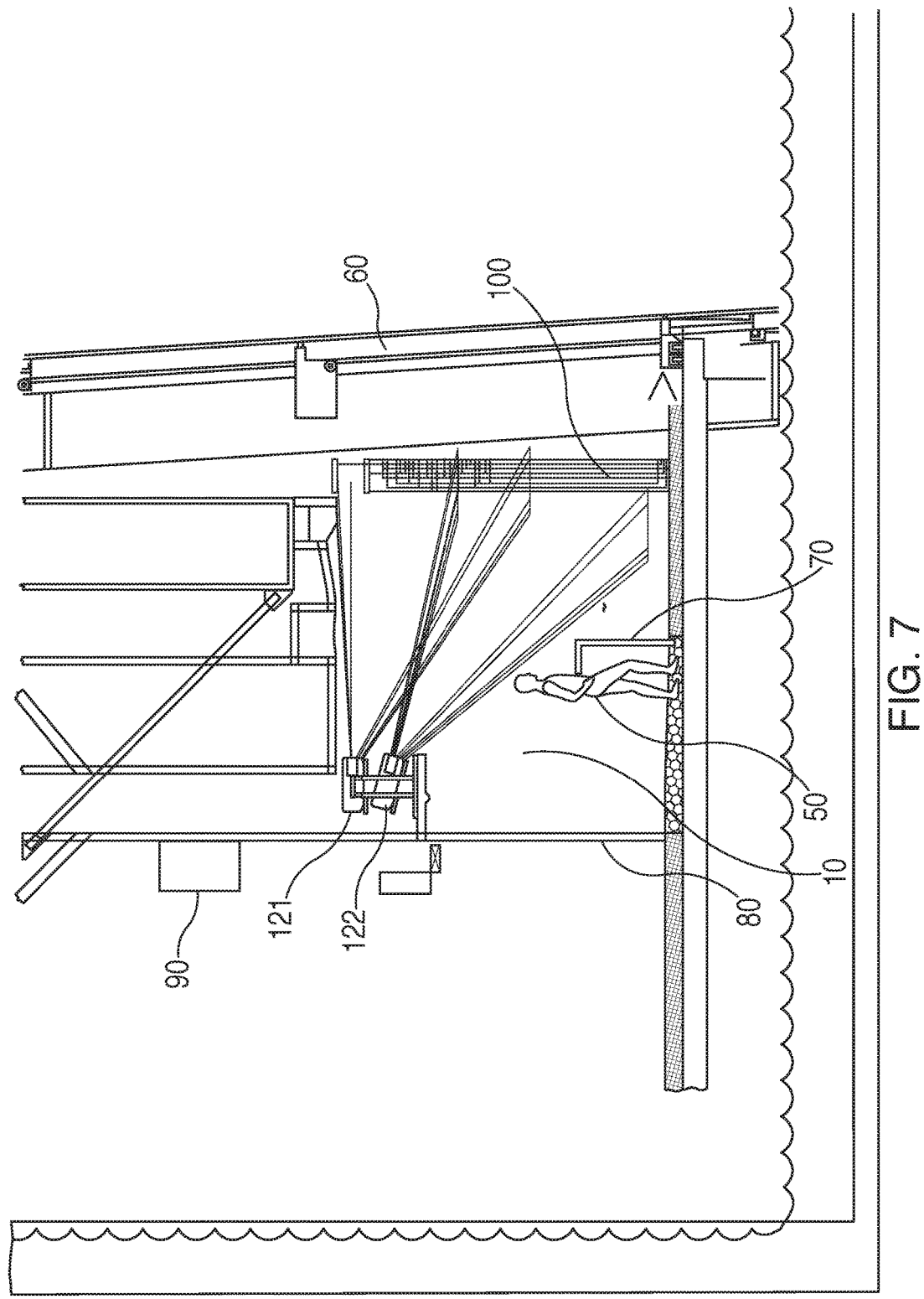
FIG. 7 is a side elevational view of the attraction theater.

The theater experience is created by the combination of the three dimensional screen system which encompasses the area in front of the viewers, as seen in FIG. 7, in a long theater environment 10 which is fairly narrow from front to back with a railing 70 in front of the viewers 50 so as to constrain them between railing 70 and the wall behind them 80 forming the back wall of the theater 10. The projectors 121-134 are located upon a support wall above and behind the back wall 80 of the theater 10 and, in a current preferred embodiment, include twenty eight digital projectors including fourteen pairs of projectors 121-134 which are, again, in a current preferred embodiment, Christie DWU600-G digital projectors oriented with a 1920×1200 pixel 5K lumens projectors. The signal processor 90 is shown in the theater 10, but can be placed elsewhere. The projector pairs 121-134 are arrayed, as shown in FIG. 1, oriented in a fashion where they provide a projection onto the screen which entirely covers the width and height of all of the surfaces of the screen 100 shown in FIG. 3D. Each pair of projectors, as shown in FIG. 7 are vertically oriented, with one on top and one on the bottom. The images projected on the three dimensional screen surfaces are determined through a process which utilizes a UV mapping system in which the textures of the three dimensional surfaces of the screen are mapped into UV space so as to allow the two dimensional source images to be projected on the screens to be mapped on a pixel basis such that the two dimensional images appear three dimensional as projected on different oriented surfaces of the screen. The UV mapping is used add texture or color to a three dimensional object which can then be more easily fitted in a two dimensional projection onto the surface of the three dimensional object. In this case, the screen is a three dimensional collection of rectangular blocks having surfaces which are perpendicular to the viewer's line of sight (i.e. flat vertical surfaces representing the walls of a "building" facing the viewer) and surfaces which are parallel to the viewer's line of sight (i.e. flat vertical surfaces representing the walls of the "building" at 90 degrees to the first walls. To make the images projected on the different surfaces of the screens appear natural and three dimensional it is critical that the images on the different types of surfaces be digitally adjusted, using the UV mapping, so that the images projected onto the parallel surfaces (i.e. the sides of the "buildings"), are properly adjusted so that they appear naturally and continuously with the images projected onto the perpendicular surfaces.

Figure 3C:
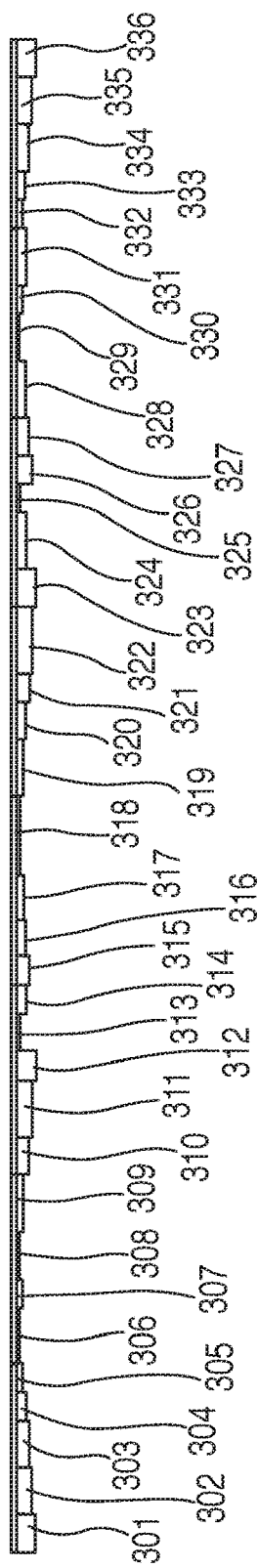
FIG. 3C is a top plan view of the panels of the screen of FIG. 3A.
Figure 3D:
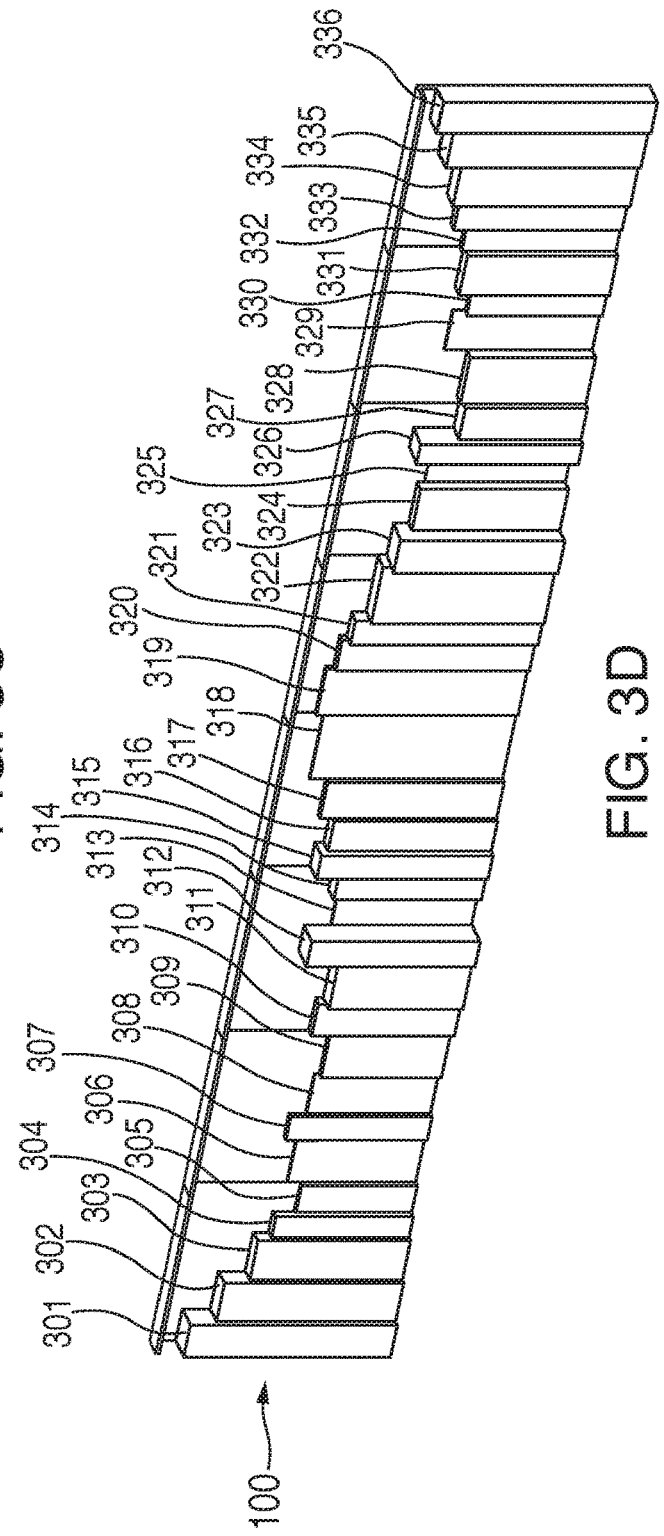
FIG. 3D is a perspective view of the side of the viewing screen panels facing the viewer.
Figure 6:
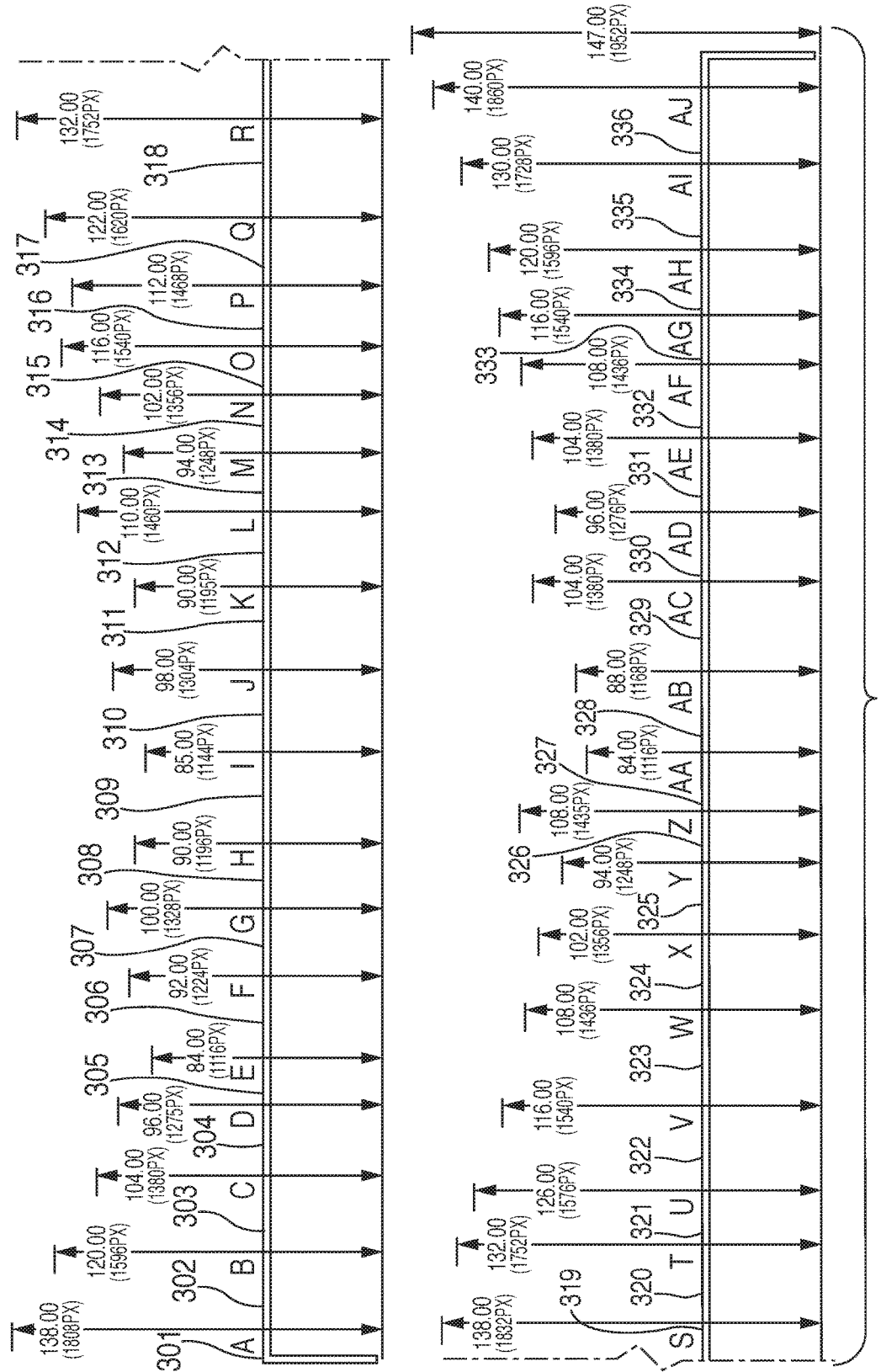
FIG. 6 is directed to another pixel map plan of the heights of the screen panels of FIG. 5 in accordance with a preferred embodiment of the invention.

In a current preferred embodiment the three dimensional screen shown in FIG. 3D is formed of a series of rectangular blocks which are significantly taller than they are wide or deep. These rectangular blocks, as shown in FIG. 6, are comprised of touching blocks with flat, planar surfaces perpendicular to the line of sight of the viewers and other surfaces which are parallel with the line of sight of the viewers forming rectangular solid blocks arrayed in a fashion where there are no gaps between the blocks but surfaces in adjacent blocks which are parallel are generally separated by at least one surface perpendicular to the planar surface (parallel to the viewer's line of sight). Projecting images on adjacent surfaces, adjusted using the UV mapping, which are perpendicular to each other, allows the viewer to see the image projected onto a three dimensional object so as to create a sense of three dimensionality to the viewer around these locations, even though the initial image projected was a two dimensional image.

Figure 5:
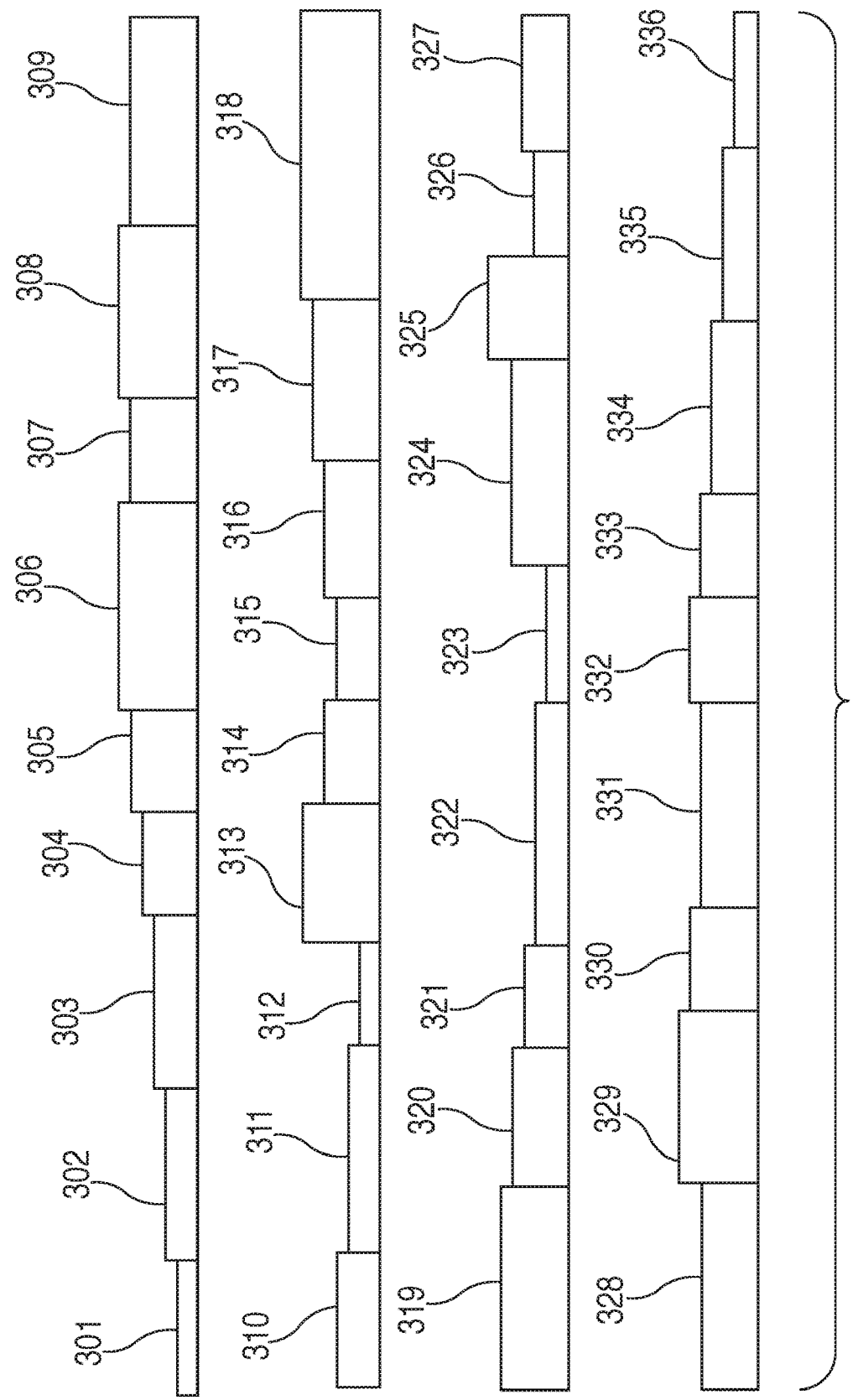
FIG. 5 is directed to a pixel map plan of the width of the screen panels in accordance with a preferred embodiment of the invention.

The screen surfaces were mapped into a UV map so as to create a pixel map which allows the images that are to be projected to be mapped into the UV space. FIGS. 3A and 3C show two maps of the screen which are used to create the UV space mapping. FIG. 3A shows the width of the blocks and FIG. 3C shows the depth of each of the blocks. FIGS. 5 and 6 show pixel maps for the UV mapping of each of the physical blocks 301-336 of the screen 100 The texture is provided to the two dimensional surfaces of the three dimensional screens in a way which makes the effective projection appear as a three dimensional image. Thereafter, once the digital projectors are oriented, using the UV mapping, so as to create their spread of projections onto the UV mapped surfaces of the screen, the images are processed using digital signal processing techniques, through either modification or masking of certain pixels, to create the appearance of a linear image across all of the surfaces of the screen. There is a tracking of each projector's actual areas of projection onto the surfaces of the screen and overlap between projectors and the projector's light splash to the pixel level so that digital signal processing of the images can be directed to the appropriate pixel outputs on all of the different projectors so that each mapped pixel on all of the surfaces of the three dimensional screen is properly shaped, modified, reduced in brightness or masked as required to produce a clean properly adjusted image. This requires initially an analysis of the surfaces on the display from one end to the other, including both surfaces perpendicular to the viewer's line of sight and those parallel to the viewer's line of sight and a conversion of the width of these surfaces into pixel units. These pixel units are then coordinated with the display map of the projectors, utilizing the UV map texture of the screen to provide a pixel by pixel mask for the image to be displayed onto the screen by the different digital projectors. With the digital projectors, the images projected are essentially produced on a pixel by pixel basis so that, depending upon the distance between the projector and a specific point on the screen, the pixel size is adjusted due to the distance between the digital projector and the surface of the screen. Pixel sizes on portions of the screen which are closer to a projector are smaller than those which are further from the projector.

Through the use of the modeling transformation of the images and processing the viewer is exposed to a three dimensional screen structure which envelopes viewer in both video and sound so that it appears on occasions as if they are either in a subway station on the platform with a subway train thundering across the screen from one side to the other with the steel beam used to support the ceiling of the subway tunnel appearing static and three dimensional while the subway car appears to be moving in front of the viewer's eyes. Speakers and subwoofers are placed strategically around the viewers in a fashion which creates a surround sound environment going along with the images on the videos and still images projected onto the screen.

In an attraction which is intended to perform several functions, the reveal of the view to an observatory's windows or other attraction's reveal, such as live animals at a zoo or other surprising but anticipated observation, there is a need to provide suspense by misdirection, causing viewers not to anticipate the reveal event until it is upon them. In the current preferred embodiment of the invention, where the reveal is the exposure of the view from a high altitude observatory, the theater 10 is set up so as to provide no warning or anticipation of the reveal which will form the last portion of the show. As seen in FIG. 7, the screen elements 100 are positioned in front of the viewer 50, with a structure which provides a complete masking of any view of the windows 60 behind the screens 100 during the show, a generally darkened theater environment and a highly engaging and potentially overwhelming video and audio display highlighting elements of the view to come. The video display includes the sights and sounds of the City, including sporting events and arenas, transportation venues, street scenes and restaurants and stores and the general hubbub of a city both in sight and sound. As the culmination of the audio/video presentation, the video screen 100 running the entire width of the theater 10 rises as the show comes to a close, with the rising screen 100 exposing the viewing windows 60 arrayed behind the screen in a fashion which provides a first view to the viewers. This initial reveal of the view highlights the significance and attractiveness of the view for a large group of people at the same time. Thereafter, a door at the far end of the theater 10 will open, allowing the viewers to proceed on to the next portion of the attraction. As seen in FIG. 3B the floor is sloped from the entrance to the exit to provide a visual cue to the viewers 50 to enter and continue up the ramp between the front railing 70 and the rear wall 80 of the viewing theater 10 so that they are distributed within the viewing area formed by the front railing 70, rear wall 80 and the entry and exit areas.

Figure 2:
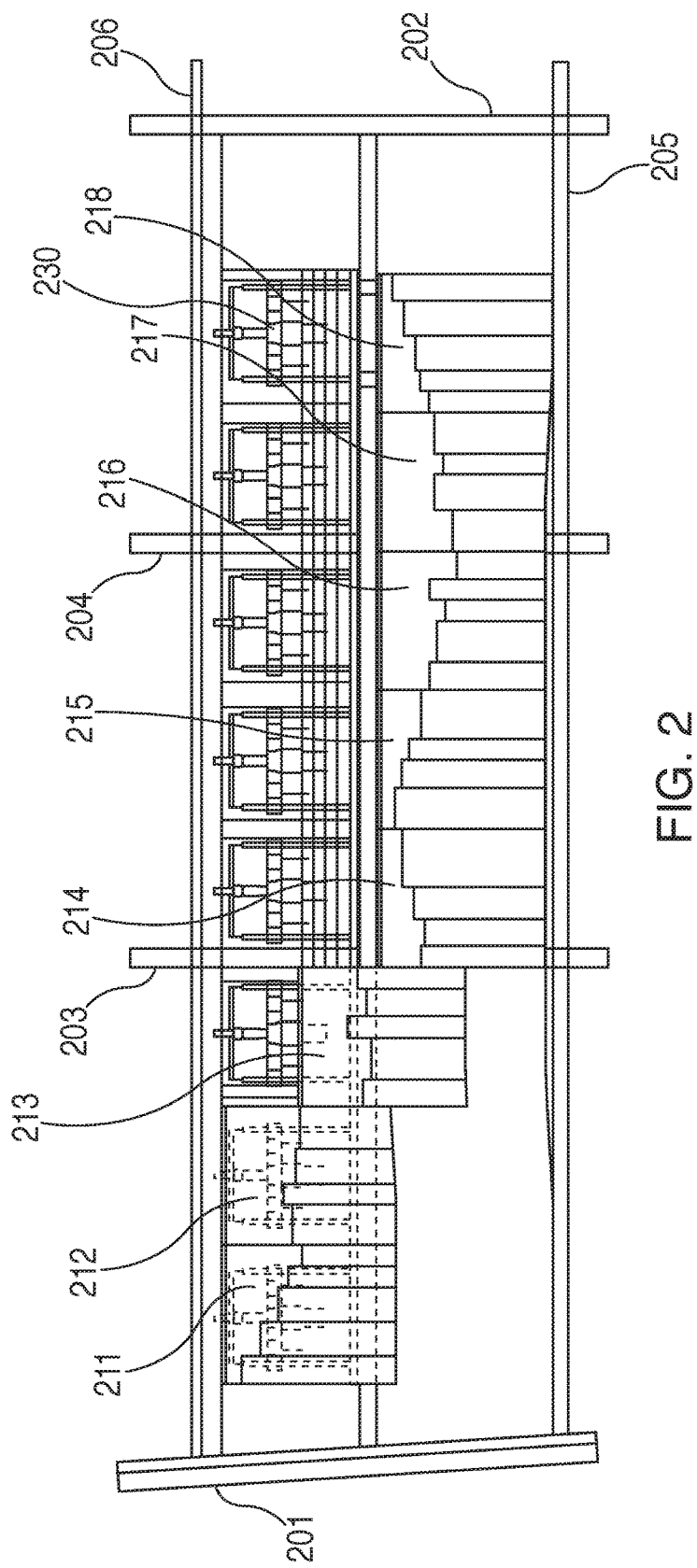
FIG. 2 is a front elevational view of the assemblies utilized to raise and lower the panels of the screen from a viewing position to a position in which the panels are raised to exposed the view behind the screen.

FIG. 2 shows the mechanism by which the display panels 211-218 are either hoisted or lowered. While FIG. 2 shows some of the panels 211, 212 hoisted, other panels 214-218 fully lowered and one panel 213 in an intermediate state, in use all of the panels will be raised or lowered as one. This figure is to show the different positions the panels 211-218 can be found at different times. In this embodiment the screen 100 is divided into eight panels 211-218. In other embodiments there can be more or less panels depending on the size and weight of the panels and the width of the theater 10. During the course of a show the viewers 50 will enter with the panels all the way down. At the end of the show, as the video presentation is ending all of the panels 218 will rise in unison, revealing the hidden view behind the panels which in this case is window 60 (FIG. 7).

As seen in FIG. 3, there are three views of the screen panels 211-218 which together form the screen 100. Each of the screen panels includes a number of the blocks 111-136. FIG. 3D shows a perspective view of the overall screen formed of the eight panels 211-218 which appear to be a city skyline comprising a series of differently sized "buildings". Other representations with other shapes can be used for other attractions in different environments. FIGS. 3A and 3B are representations of the heights of the different "buildings" in the panels and a cross sectional view of the structure of the screen 100 along line A-A of FIG. 3A.

Figure 4:
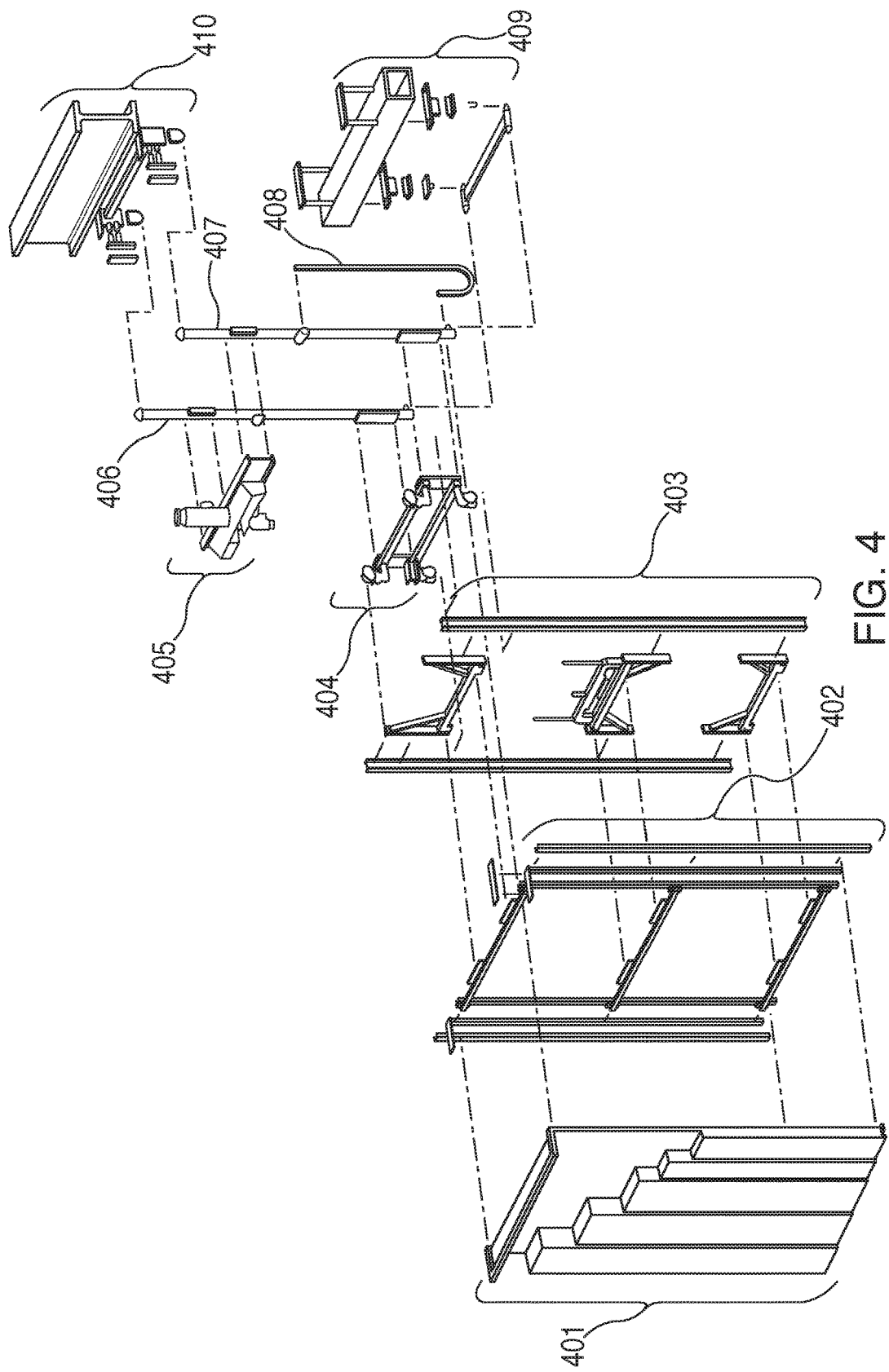
FIG. 4 is an exploded view of the components of the system used to support and raise the screen panels between the upper and lower positions.

With reference to FIG. 4 the construction of screen panel 211 (though any of the screen panels 211-218 would have a similar construction) is shown with the outer panel 401 at the left, the support structures 402, 403 for the panel in the two portions to the right of the outer panel 401 and the connectors 404, 405 to the hoisting assembly, connecting rods and assemblies 406, 407, 408, and connection to the structural elements 409, 410 of the room on the right. The outer panel 401 is a rigid member which includes the "building" profiles in front of a flat background seen toward the top of the panel 401 above the tops of the "buildings". The remaining panels are used to securely affix the panel 401 in place in a fashion which allows the machinery 230 shown in FIG. 2 to move the panels 401 from their initial viewing locations as shown by panels 214-218 in FIG. 2, through the mid hoist position shown for panel 213, to the full reveal position as shown by panels 211, 212. Mechanisms 230, which move the panels from the viewing position where the screen 100 is all that a viewer 50 would see, to the full reveal position which exposes the windows 60 (FIG. 7), are coordinated with the show. In a preferred embodiment the images projected on the screen 100 are continued to be projected on the screen 100 as it moves up into the reveal position. This "tricks" the viewers 50 into following the image up out of the viewing area until a significant portion of the reveal is present and the viewers 50 can then see the view out of the windows 60.

Another aspect of the theater experience with the reveal is to establish a regular flow of visitors through the attraction. In a current preferred embodiment of the invention, the limiting factor for introducing visitors into the attraction and taking them away are a series of elevators which carry a limited number of visitors at each time. In the current preferred embodiment of the attraction there is a bank of five separate elevators which transport visitors from a ground floor up to the $102^{nd}$ floor of One World Trade Center and back down again. The theater attraction is designed to hold the full capacity of all five elevators for one show. As a result, with the elevators running essentially continuously to both bring visitors up from the ground floor and return them from the $100^{th}$ floor to the ground floor, the area outside of the theater will collect the visitors in all five of the elevators before opening the doors to the theater attraction and exposing them to the show followed by the reveal. The length of the show in the theater is designed to be equal to the time it will take for the five elevators to fill and bring the viewers from the ground floor to the $102^{nd}$ floor. An area outside of the theater is designed to hold the people until the previous show has finished and the viewers in that show file out of the theater into the main portion of the attraction with panoramic windows. This timing is set so that as doors to the attraction begin to open the fifth load of visitors is dropped off by their elevator on the $102^{nd}$ floor. By the time the show has been completed and the visitors have filed out of the theater, and the display screens have returned to their original position blocking the view of the outside, the theater will be ready to receive the next group of visitors from the next five elevator loads. In this way, the visitors through the attraction are channeled in discrete groups which allow for a steady and reliable flow through the overall attraction such that there are not logjams or other problems with crowd management. Similarly, the elevators, emptied of the visitors who have ridden up from the ground floor, are now ready to take the visitors who've completed their time at the observatory back down from the $100^{th}$ floor down to the ground floor. The cycling of the elevators allows for a steady stream of visitors into and out of the observatory without having anyone wait too long.

Reference is next made to FIG. 5 wherein a pixel map of the screen 100 constructed in accordance with a preferred embodiment of the invention is depicted. The screen 100 is quite long and, thus, is broken up into four sections as shown in FIG. 5. The top image in FIG. 5 is the leftmost portion of the screen as viewed by the visitors. The second row image is the next section of the screen which is to the right of the top image as viewed by the visitors. Similarly the third and fourth lines represent the third and fourth sections of the screen, with the fourth line being the rightmost portion of the screen as viewed by the visitors. As shown, the portion facing the viewer is the portion at the top of each of the images. As can be seen, with the identification of the surfaces, they are marked both by the block to which they are attributed and numbers identify each of the 71 surfaces. For example, the first block on the top includes two surfaces, a surface A-1 which will be perpendicular to the viewer and a surface A-2 between block A and block B which will be parallel to the viewer's line of sight. Because the blocks have different depths, to simulate a city skyline, the blocks are of different depths creating the surfaces which are parallel to the viewer's line of sight such as surfaces A-2, B-4, C-6 and D-8. Wherever the blocks are at different depths from the viewer, surfaces parallel to the viewer's line of sight will be created between adjacent surfaces which are perpendicular to the viewer's line of sight.

With reference to FIG. 6, there is another pixel map which shows the height of each of the surfaces perpendicular to the viewer's line of sight both in inches and in pixels. As seen in FIG. 6, which includes the left half of the screen 100 on the upper portion and the right half of the screen 100 on the bottom, the height of each block is shown both in inches and in pixels. This pixel map is utilized in connection with the digital signal processing which is incorporated to convert the source images into images which project correctly onto the surface of each of the blocks using the UV mapping. The rectangular solid shape of each of the blocks means that the surfaces which are perpendicular to the viewer's line of sight and those which are parallel to the viewer's line of sight have the same height. This is what you'd expect with a building, with a flat roof.

Reference is made to FIG. 7 wherein a side elevational view of a visitor 50 standing in the theater 10 is shown. One can see the digital projectors 121, 122 mounted atop a ceiling at the back of the viewing area angled toward the screen 100 which is in front of the viewer. The short vertical line in front of the viewer is a railing 70 which prevents any viewers 50 from standing closer than that to the screen 100. This provides for better viewing and clearer lines of sight. In general, when the images are reduced to the pixel level the pixel size ranges are preferably in a range from 0.05 inches through 0.10 inches and more preferably from 0.072 inches-0.082 inches from top to bottom. The images from different projectors tend to overlap and blend which requires both geometry correction and masking to assure a clear image. These corrections and masking activities are programmed in so that similar transformations and corrections may be made automatically on the images as they are ready for projection onto the three dimensional screen. These transformations are performed in a way that the images displayed on screen 100 and the varying surfaces of the "buildings", some of which are perpendicular to the viewer's line of sight and others are parallel to the viewer's line of sight are adjusted on a pixel by pixel basis for the varying distances from the projectors to the pixel's surface. As there is a fixed relationship between the projectors and the screen surfaces the transformations, mapping and textures can be set so that any image to be projected can be rapidly transformed so it will project clearly and properly on the screen 100.

Accordingly, an improved theater display for providing three dimensional appearing images on a three dimensional display screen from two dimensional images is provided in an environment in which the display screens are motorized so as to elevate at the end of a show and provide a reveal to a visual experience available behind the screens. Also, the theater experience can be used as a gateway to the observatory experience, serving the multiple roles of educating a viewer on what will be seen, providing a surprise reveal experience, and performing a gating function for the attraction by collecting and grouping a predefined number of viewers who will enter the attraction together and then providing a sufficient gap of time before it allows a next group of viewers to enter the attraction.

In addition, the invention is directed a presentation environment in which an audio/visual surround experience is provided with three dimensionality to the display created by the three dimensional display screens receiving digitally projected images which are modified through digital signal processing and UV mapping to create true to life mapping of the texture of the three dimensional surfaces in anticipation of a reveal event.

It will thus be seen that the objects set forth above, among those made apparent in the preceding description, are efficiently obtained, and, since certain changes may be made in the above construction without departing from the spirit and scope of the invention, it is intended that all matter contained in the above description or shown in the accompanying drawings shall be interpreted as illustrative, and not in a limiting sense.

It is also understood that the following claims are intended to cover all of the generic and specific features of the invention herein described and all statements of the scope of the invention, which, as a matter of language, might be said to fall therebetween.

What is claimed is:

1. An audiovisual theater, comprising:
    a theater, having a floor, ceiling, back wall, front wall and railing between the back wall and front wall having a region of interest therein, the area between the back wall and railing defining a viewing area for viewers;
    a screen placed between the viewing area and the front wall;
    the screen defining a planar primary surface with a top, a bottom, and left and right sides; the planar primary surface having a three-dimensional relief visible from the viewing area and extending over a substantial portion of the screen between the left and right sides, the three-dimensional relief having a plurality of forward surfaces, a plurality of side surfaces, and a plurality of top surfaces, wherein the forward, side, and top surfaces define a plurality of polyhedrons extending outwards from the planar primary surface, each forward surface having a respective width between the sides of the screen, a height relative to the bottom of the screen, and a displacement from the primary surface, at least some of the forward surfaces differing from other forward surfaces in one or more of respective width, height, and displacement;
    a plurality of projectors spaced from the screen and configured to project images on the screen, the projectors placed proximate the ceiling;
    the screen being movable between a first, show position where the screen obscures the region of interest therein from the viewing area and a second, reveal position where the screen does not obscure the region of interest therein from the viewing area.

2. The audiovisual theater of claim 1 wherein the front wall is a window and the viewers can see through the window when the screen is in the second, reveal position.

3. The audiovisual theater of claim 1 wherein the polyhedrons comprise rectangular prisms the forward surfaces being substantially perpendicular to the planar primary surface and the side surfaces being substantially normal to the planar primary surface, the respective heights of the forward surfaces of the rectangular prisms being greater than the respective widths of the forward surfaces.

4. The audiovisual theater of claim 3 wherein the plurality of forward surfaces, plurality of side surfaces, and plurality of top surfaces are reduced to pixel maps covering the pixel maps being used to UV map images projected from the plurality of projectors onto at least the three dimensional relief portion of the screen.

5. The audiovisual theater of claim 3, wherein the rectangular prisms are arranged so that adjacent rectangular prisms are touching and without an intervening gap exposing the planar primary surface.

6. The audiovisual theater of claim 1, further comprising a lifting mechanism coupled to the screen and configured to move the screen vertically between the first position and the second position.

7. The audiovisual theater of claim 6 wherein the plurality of projectors projects an image which tracks along with the movement of the screen from the first position to the second position.

8. The audiovisual theater of claim 1, wherein in the first position the screen substantially obscures the region of interest from substantially the entire viewing area and in the second position a substantial portion of the screen is not visible from the viewing area.

9. The audiovisual theater of claim 1, wherein during a transition of the screen from the first position to the second position, the region of interest is exposed to substantially all of the viewing area simultaneously.

10. The audiovisual theater of claim 1, wherein the region of interest comprises at least one window in the front wall.

11. The audiovisual theater of claim 1, wherein the screen is comprised of a plurality of panels, each panel having a portion of the three-dimensional relief formed thereon.

12. The audiovisual theater of claim 1, wherein the screen extends for substantially an entire width of the front wall.

13. The audiovisual theater of claim 1, wherein the plurality of projectors comprise a plurality of pairs of projectors, each pair of projectors placed proximate the ceiling and vertically adjacent to each other.

* * * * *